United States Patent [19]

Bochot

[11] 4,441,315
[45] Apr. 10, 1984

[54] REACTION ASSEMBLY FOR A TORQUE CONVERTER AND A TORQUE CONVERTER COMPRISING SUCH A REACTION ASSEMBLY

[75] Inventor: Jean C. Bochot, Claye-Souilly, France

[73] Assignee: Valeo, Paris, France

[21] Appl. No.: 343,107

[22] Filed: Jan. 26, 1982

[30] Foreign Application Priority Data

Jan. 27, 1981 [FR] France ................................ 81 01452

[51] Int. Cl.³ ............................................ F16D 33/18
[52] U.S. Cl. .................................... 60/345; 192/3.21; 192/45
[58] Field of Search ......................... 60/341, 343, 345; 192/45, 3.21, 3.28, 3.31, 110 R, 110 B

[56] References Cited

U.S. PATENT DOCUMENTS

| | | | |
|---|---|---|---|
| 3,901,030 | 8/1975 | Wonn .................................... | 60/341 |
| 3,954,161 | 5/1976 | Ehret et al. ........................... | 192/45 |
| 3,966,032 | 6/1976 | Koivunen ...................... | 192/3.31 X |
| 4,009,570 | 3/1977 | Ohkvoo et al. ........................ | 60/341 |
| 4,377,068 | 3/1983 | Braatz ................................... | 60/341 |

Primary Examiner—Leonard E. Smith
Attorney, Agent, or Firm—Charles E. Brown

[57] ABSTRACT

A reaction assembly for a torque converter is disclosed. The outer race of an overrunning clutch is engaged in the axial bore of a reactor member, the outer race bearing axially on one side against a transverse flange of the reactor member. A keeper ring bears against the other axial side of the outer race for axially maintaining the outer race with respect to the reactor member. A bayonet mount is provided between the keeper ring and the reactor member. The keeper ring is rotationally connected to the reactor member by at least one tab fixed to the keeper ring and axially engaged in an axial slot in the reactor member between two shoulders thereon.

11 Claims, 11 Drawing Figures

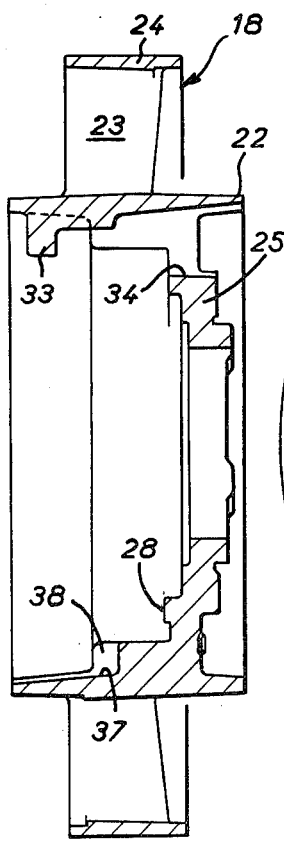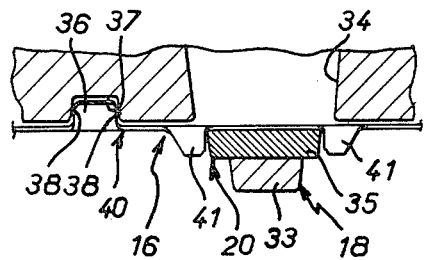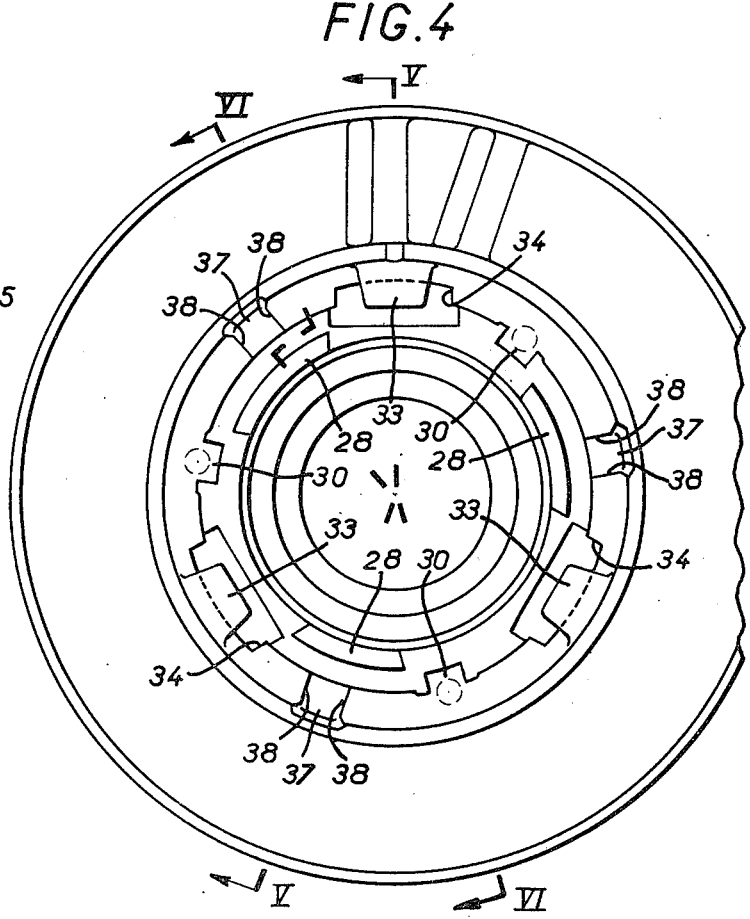

REACTION ASSEMBLY FOR A TORQUE CONVERTER AND A TORQUE CONVERTER COMPRISING SUCH A REACTION ASSEMBLY

FIELD OF THE INVENTION

The present invention relates generally to torque converters, and more particularly torque converters for motor vehicles. The invention is more especially concerned with the reaction assembly of such a torque converter.

BACKGROUND OF THE INVENTION

It is well known that such torque converters generally comprise a housing, an impeller connected for rotation with the housing and adapted to be fixed for rotation with a first or driving shaft which in practice is the engine output shaft in the case of a motor vehicle, a turbine freely rotationally mounted relative to the housing and adpated to be fixed for rotation with a second or driven shaft which in the case of a motor vehicle is the gearbox input shaft, and a reactor member arranged between the impeller and turbine.

The reactor member must be suitably axially fixed between the turbine and the impeller in order to withstand the axial thrust and impact in the course of operation. The reactor hub receives within its axial bore the outer race of an overrunning clutch having rollers or cams, for example, the inner race is formed by the reactor sleeve itself and rotationally fixed thereto which is usually part of the gearbox in the case of a motor vehicle, or formed by an intermediate sleeve fixed against rotation relative to the reactor sleeve, e.g. by a splined connection.

To axially maintain the overrunning clutch, there are usually provided two keeper rings which in addition are utilized to ensure the centering of the reactor member and obtain the annular space necessary for the correct positioning of the overrunning clutch and also to transmit axial thrust applied in operation to the reactor member. The keeper ring disposed on the impeller side is generally subjected to higher loads.

To simplify the construction of the converter and to reduce the axial dimension and the cost thereof, it has already been proposed to incorporate into the reactor member one of the keeper rings, preferably the one on the impeller side. In this event that keeper ring is in one piece with the reactor member and comprises a transverse flange against which the outer race of the overrunning clutch bears axially.

On the other side of the outer race of the overrunning clutch is the remaining keeper ring which bears axially against the reactor member and ensures axial maintenance of the outer race with respect to the reactor member.

Such an arrangement has numerous advantages but not exclusively for the use of overrunning clutches with locking ramps or rollers for which the annual space between the outer race and the reactor sleeve or the intermediate sleeve between the outer race and the reactor sleeve or the intermediate sleeve does not require as high precision as overrunning clutches with cams.

First of all, as mentioned above, it reduces the axial dimension of the converter. Indeed, the axial dimension may be reduced as the centering of the reactor hub is provided by a single transverse flange thereon, and no axial bearing centering member is any longer necessary between the reactor hub and more particularly the outer race of the overrunning clutch on which it is received, on the one hand, and the flange and/or the remaining keeper ring which has no centering function, on the other hand.

Furthermore, the reactor and its transverse flange together define a single part which may advantageously be cast or molded of metal or plastic material, requiring only minimal machining, namely deburring; such is not the case with the remaining keeper ring. Further, since the outer race of the overrunning clutch has no centering function for the keeper rings, its axial dimension may be limited to that which is absolutely necessary for its cooperation with the associated rollers or cams of the overrunning clutch which reduces the weight and the cost.

Moreover, the reactor hub, the overrunning clutch and the remaining keeper ring may advantageously comprise a reaction assembly which defines a distinct entity which upon assembly facilitates manipulation and thereby correspondingly reduces assembly time and which in the course of use permits it to follow as a unit the axial deformations of the housing in which it is arranged without any of its various component parts accidentally coming apart in the axial direction. It is, however, unnecessary to provide between these various components to the detriment of limiting the axial dimension of the assembly, overly long axial bearing surfaces.

Yet to form such a reaction assembly, it is necessary, as mentioned above, for the keeper ring to bear axially against the reactor. In heretofore known arragements such an axial bearing has resulted, for example, from the mounting between the keeper ring and the reactor member by crimping or swaging the material of the reactor at the inner periphery thereof on the side of the keeper ring, the material being driven back radially at spaced locations into contact with the keeper ring.

Such an arrangement has drawbacks. First of all, it is in practice only appropriate when the reactor is made of metal. But in at least some cases it is desirable that the reactor member be made of a material other than metal, e.g., plastic, as mentioned above, plastic materials cannot be crimped or swaged.

Furthermore, such an operation is irreversible and taking the converter apart is not possible without destroying the assembly means.

In another known arrangement, the keeper ring is rotationally driven with the reactor by a combination of dogs and notches and it is maintained axially by an abutment ring. But this arrangement requires the machining of the groove which receives the abutment ring.

The present invention has as a general object the provision of a device requiring minimal or no machining, and providing dismountability and the possibility of using a material other than metal.

According to the invention there is provided a reaction assembly for a torque converter of the type comprising a reactor member having an axial bore and a transverse flange, an overrunning clutch having an outer race received in the axial bore. One axial end of the outer race bears axially against the transverse flange of the overrunning clutch. A ring on the other axial side of the outer race of the overrunning clutch bears axially against the reactor member and maintains the outer race relative to the reactor member. The reaction assembly is characterized by a bayonet mount means between the ring and the reactor member, and by locking means associated with the ring to fix it against rotation relative to the reactor hub. According to another aspect of the invention a torque converter is provided having such a reaction assembly.

The bayonet mount means provided according to the invention may be utilized with reactor members made of metal or plastic material, and the same holds for the ring.

Preferably, the bayonet mount means is advantageously reversible.

In conjunction therewith, the rotational connecting means associated with the keeper ring which may have limited or no angular clearance prevents the keeper ring from coming off the reactor member for any mount of relative angular rotation. In addition, the rotational connecting means positively locates the friction which the keeper ring produces. The friction should preferably develop between the keeper ring and the turbine, for example, and not between the keeper ring and the reactor member.

Preferably, the connecting means comprises at least one tab which is fixed to or integral with the keeper ring and is engaged axially into opening or slot in the reactor member between two axial shoulders thereon. The opening or slot extends acially through the reactor member and therefore opens axially on the opposite side from the tab in case the assembly is to be dismountable.

At the time of initial assembly of the keeper ring, the tab for ensuring that fixing of the keeper ring for rotation with the reactor member extends transversely relative to the axis of the assembly. After assembly of the keeper ring the tab is folded over into the corresponding opening in the reactor member.

According to a preferred embodiment, the tab is part of a tab washer separate from the keeper ring and is disposed axially between the outer race of the overrunning clutch and fiwed for rotation therewith.

Alternatively, the tab is part of the keeper ring and is formed in one piece therewith.

In any event, the bayonet mount means according to the invention is a particularly easy and quick mounting means while being thoroughly secured.

BRIEF DESCRIPTION OF THE DRAWINGS

The features and advantages of the invention will be further brought out in the description which follows, by way of example, with reference to the accompanying drawings.

FIG. 2 is a fragmentary elevational view, partially cutaway, taken along the line II—II in FIG. 1;

FIG. 3 is a fragmentary circumferential view of the reaction assembly, laid out flat, taken along line III—III in FIG. 2;

FIG. 4 is a fragmentary elevational view of the reactor hub of the reaction assembly, taken on its own;

FIGS. 5 and 6 are longitudinal sectional views of the reactor hub respectively taken along lines V—V and VI—VI in FIG. 4;

FIG. 1 shows a torque converter. Such a torque comprises a rotating housing 10, an impeller 11 inside the housing 10 fixed for rotation with the housing, the impeller blades 12 being carried directly by the impeller itself. The torque converter also comprises a turbine 13 inside the housing 10 having turbine blades 14 freely mounted for rotation relative to the housing 10 and carried by a separate hub 15. Finally, a reaction assembly 16 is arranged between the impeller 11 and the turbine 13. The reaction assembly is an independent entity or unit inside the torque converter and comprises a reactor member 18, an overrunning clutch 19 having an outer race 26, and a keeper ring 20.

Figure 1:
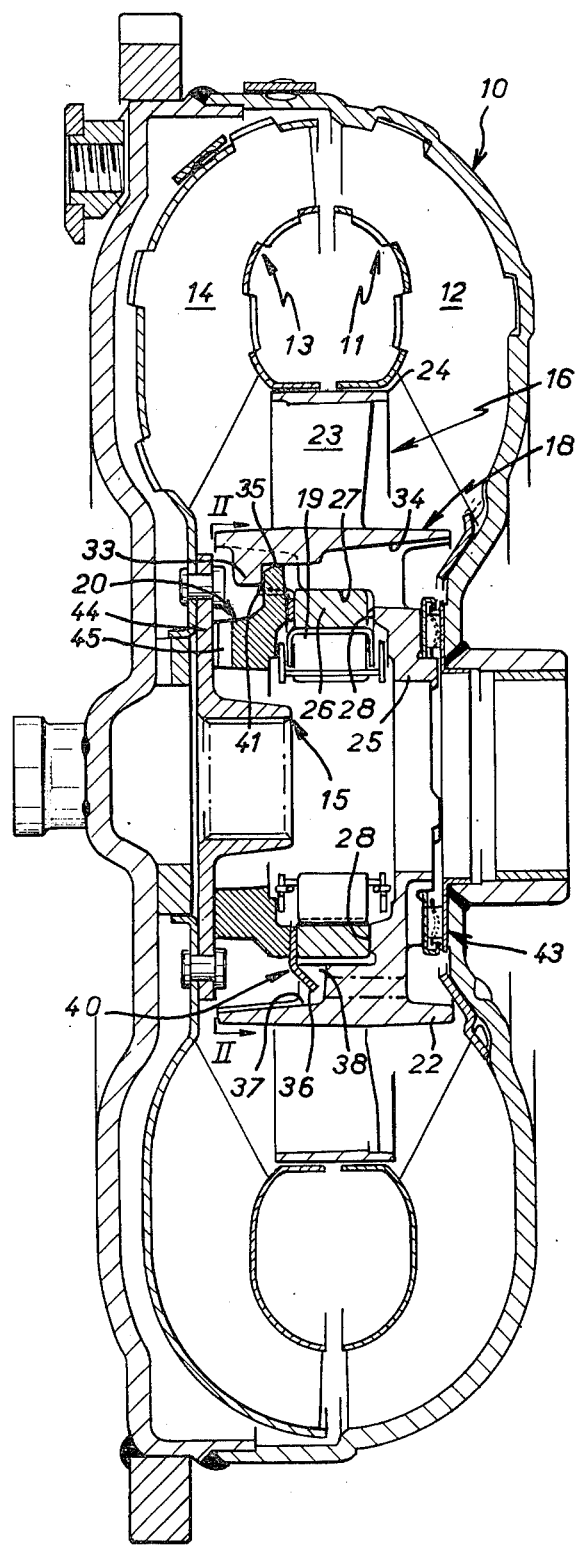
FIG. 1 is a longitudinal sectional view of a torque converter having a reaction assembly embodying the invention.
Figure 6:
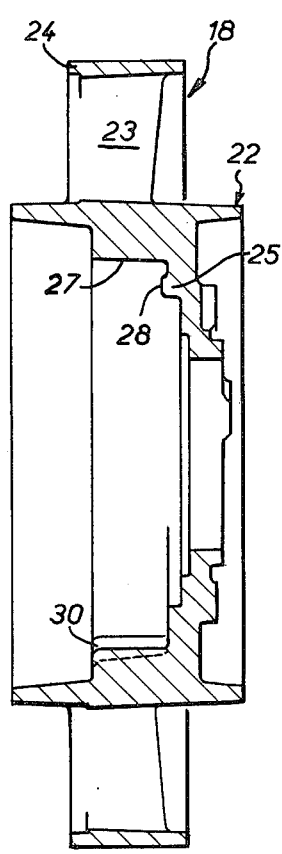
Figure 7:
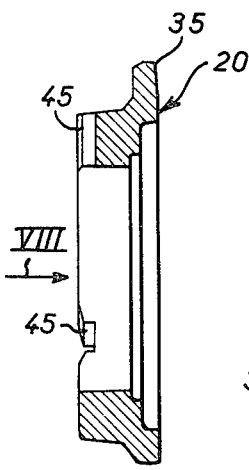
FIG. 7 is a longitudinal sectional view of the keeper ring of the reaction assembly, taken on its own.
Figure 8:
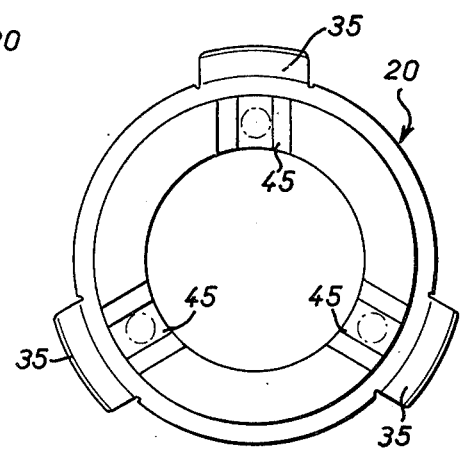
FIG. 8 is an elevational view of the keeper ring taken in the direction of arrow VIII in FIG. 7.

The reactor member 18 comprises in a one-piece construction a reactor hub 22, and reaction blades 23 which protrude from the outer periphery of the reactor hub 22 between the hub and an annular member 24. The reaction blades 23 are arranged in the hydraulic circuit formed by the impeller blades 12 and the turbine blades 14 between the same. The reactor member 18 further comprises a transverse flange 25 arranged annularly at the inner periphery of the reactor hub 22 on the impeller side.

The overrunning clutch 19 is preferable of the type having rollers, as illustrated, but may alternatively be of the type having cams in which case suitable precision centering need by provided. The outer race 26 of the overrunning clutch 19 bears axially on a first axial side against the transverse flange 25 of the reactor member 18. To this end, in the illustrated embodiment, the transverse flange 25 has angularly spaced axial bosses 28 extending circumferentially along a circular sector. The axial bosses 28 are three in number in the illustrated embodiment, see FIG. 4, and they are uniformly spaced 120° from one another.

In order to lock the outer race 26 of the overrunning clutch 19 for rotation with the reactor member 18, at least one rib 30 is provided extending radially into the bore 27 of the reactor hub 18. The rib or ribs 30 are axially elongate and are engaged in complementary axial grooves 31 between ribs on the outer race 26, see FIG. 2. In the illustrated embodiment three ribs 30 are provided, regularly spaced 120° from one another, see FIG. 4.

The inner race of the overrunning clutch 19 is not illustrated in the drawings. It may be a rotationally fixed reactor sleeve which is part of the associated gearbox with which the converter is in engagement. Alternatively, the inner race may be an intermediate sleeve which is part of the torque converter through which the torque converter is in engagement with the reactor sleeve, e.g., through a splined connection.

The keeper ring 20 is disposed on the other axial side of the outer race 26 of the overrunning clutch 19 relative to the transverse flange 25 of the reactor member 18 and extends transversely relative to the axis of the assembly like the transverse flange.

The keeper ring 20 bears axially against the reactor member 18, as described in greater detail hereinbelow, and it maintains the outer race 26 of the overrunning clutch 19 axially relative to the reactor member 18 (optionally with slight axial play) in cooperation with the transverse flange of the reactor member 18.

These arrangements are in their concept well known per se and therefore need not be described herein in greater detail.

According to the invention, a bayonet mount means is provided between the keeper ring 20 and the reactor member 18. In the illustrated embodiment, the bayonet mount means comprises at least two lugs 33 extending radially inwardly toward the axis of the assembly. The lugs 33 extend parallel to and spaced from the transverse flange 25 and in practice at the end of the reactor hub 22 adjacent the turbine 13.

Preferably, in the illustrated embodiment three lugs 33 are provided regularly angularly spaced 120° from one another. Each of the lugs 33 extends in registry with an axial slot 34 in the reactor hub 22 adapted to receive a molding plunger.

In registration, the keeper ring 20 has in conjunction therewith along its outer periphery at least two lugs 35 and in practice three lugs angularly spaced 120° from one another which project radially outwardly, away from the axis of the assembly.

According to the invention, connecting means are associated with the keeper ring 20 for fixing it for rotation with the reactor member 18 with little or no angular play. The rotational connecting means comprises at least one tab 36 integral with the keeper ring 20 and is axially engaged into an axial slot 37 in the reactor member 18 between two shoulders 38 thereon. In practice, and as shown, three such tabs 36 are provided regularly angularly spaced 120° from each other. And in registration three axial slots 37 are similarly provided in the reactor member 18.

In the embodiment illustrated in FIGS. 1-10, the tabs 36 of a tab washer 40 which is separate from the keeper ring 20 is disposed axially between the keeper ring 20 and the outer race 26 of the overrunning clutch 19 and is connected for rotation with the keeper ring 20.

In the illustrated embodiment, the tab washer 40 comprises for its rotational connection with the keeper ring 20, and for each lug 35 thereon, two tongues 41 by which it is in engagement with the lugs 35 on the keeper ring 20. The tongues 41 defining in pairs bifurcations axially engaging the lugs 35.

Figure 9:
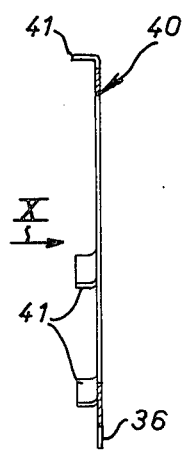
FIG. 9 is, prior to assembly, a longitudinal sectional view of the tab washer of the reaction assembly in the embodiment of FIGS. 1 and 2, taken on its own.
Figure 10:
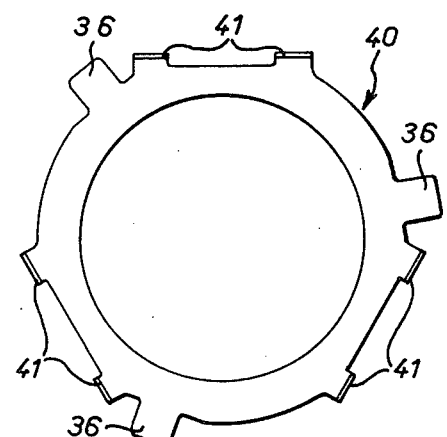
FIG. 10 is an elevational view of the tab washer taken in the direction of arrow X in FIG. 9.

The tongues 41 of the tab washer 40 are initially bent at right angles relative to the general plane of the tab washer whereas the tabs 36 of the tab washer 40 lie initially in the plane of the tab washer, see FIGS. 9 and 10. But the tabs are bendable.

The assembly of the reaction assembly 16 thus constructed will now be described. The overrunning clutch 19 is, first of all, positioned in the axial bore 27 of the reactor hub 18 by axial engagement of the outer race 26 in the bore 27 until the bosses 28 on the transverse flange 25 of the reactor hub come into axial abutment. The keeper ring 20 on which the tab washer 40 is positioned is then presented axially with its lugs 35 angularly offset relative to the lugs 33 of the reactor member 18 so as to be engaged axially therebetween. After such axial engagement the keeper ring 20 is rotated about the axis of the assembly until its lugs 35 are engaged under the lugs 33 of the reactor member 18. By means of a tool or instrument, axially force is then applied to tabs 36 of the tab washer 40 to bend them into the axial slots 37 in the reactor member 18 between the corresponding shoulders 38 thereon.

Any rotation of the keeper ring 20 relative to the reactor member 18 is then limited to very little or no angular play, the keeper ring 20 then being connected for rotation with the tab washer 40 by the tongues 41 thereon. The tab washer 40 is itself connected for rotation with the reactor member 18 by its tabs 36.

Once the reaction assembly 16 is in position in the torque converter it is in axial abutment against the wall of the housing 10 carrying the impeller 11 by means of an axial abutment 43 and in axial abutment through the keeper ring 20 against the turbine hub 15, and more specifically the radial collar 44 usually provided on the turbine hub 15 for supporting the toroidal wall carrying the corresponding turbine blades 14.

It is similarly usual for fluid flow for the keeper ring 20 to have radial grooves 45 spaced along its outer transverse surface, that is, the transverse surface which bears against the radial collar 44 of the turbine hub 15.

According to modification schematically shown in FIG. 1 by phantom lines, each axial slot 37 in the reactor member 18 extends axially therethrough and opens axially opposite the tabs 36 which is in engagement there.

It is possible to take the reaction assembly 16 apart: it suffices to straighten the tabs 36 by means of a tool engaged for this purpose in the corresponding axial slot 37 of the reactor member 18 from the end of the axial slot remote from the tab 36.

Figure 11:
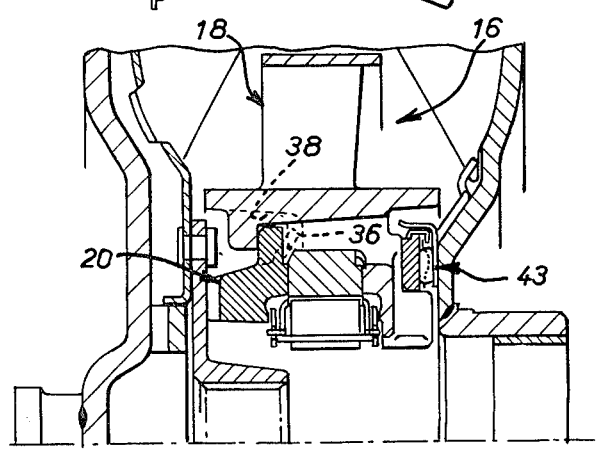
FIG. 11 is a fragmentary view similar to that of FIG. 1 for an alternative embodiment.

In the alternative embodiment illustrated in FIG. 11, each one of the tabs 36 employed for rotational connection of the keeper ring 20 with the reactor member 18 is formed in one piece with the keeper ring 20.

According to another alternative embodiment the tab washer 40 is selected of elastic material and the tabs 36 are elastically deformable and are pre-bent into the configuration shown in FIG. 1; the assembly is carried out as above except with an axial load during the rotation of the keeper ring 20 until the tabs 36 snap into place in the axial slots in the reactor member 18.

The present invention is moreover not limited to the illustrated and described embodiments but admits of various alternatives and modifications which will be apparent to those skilled in the art without departing from the spirit and scope of the appended claims.

For example, in the illustrated embodiment of FIGS. 1-10 instead of tongues enclosing the lugs of the keeper ring 20, the tab washer 40 may have tongues for rotational connection with the keeper ring 20, each individual tongue being received in recesses provided for this purpose in the corresponding lugs of the keeper ring 20.

What is claimed is:

1. In a torque converter of the type comprising a housing, an impeller fixed for rotation with said housing, a turbine freely rotatably relative to said housing, a reaction assembly interposed between said impeller and said turbine, said reaction assembly comprising a reactor member having an axial bore and a transverse flange, an overrunning clutch having an outer race, said outer race of said overrunning clutch being engaged in said axial bore of said reactor member, said outer race bearing axially on one side against said transverse flange of said reactor member, and a keeper ring bearing against the other axial side of said outer race for axially maintaining the outer race with respect to said reactor member, the invention wherein bayonet mount means is provided between said keeper ring and said reactor member, and connecting means associated with said keeper ring for rotationally connecting said keeper ring to said reactor member.

2. A reaction assembly for a torque converter, said reaction assembly comprising a reactor member having an axial bore and a transverse flange, an overrunning clutch having an outer race, said outer race of said overrunning clutch being engaged in said axial bore of the reactor member, said outer race bearing axially on one side against said transverse flange of said reactor member, and a keeper ring bearing against the other axial side of said outer race for axially maintaining the outer race with respect to said reactor member, the invention wherein bayonet mount means is provided between said keeper ring and said reactor member, and connecting means associated with said keeper ring for rotationally connecting said keeper ring to said reactor member.

3. The reaction assembly according to claim 2, wherein the said bayonet mount means comprises at least two radial lugs extending radially inwardly from said reactor member and in registration therewith at least two radially outwardly extending lugs at the outer periphery of said keeper ring.

4. The reaction assembly according to claim 2, wherein said connecting means comprises at least one tab fixed to the keeper ring and axially engaged in an axial slot in said reactor member between two shoulders thereon.

5. The reaction assembly according to claim 4, wherein said tab is integrally formed with said keeper ring.

6. The reaction assembly according to claim 4, wherein said tab is bendable.

7. The reaction assembly according to claim 4, wherein said tab is elastically deformable and pre-bent.

8. The reaction assembly according to claim 4, wherein the slots in said reactor member for receiving said tabs extend axially through said reactor member and open on the side axially remote from said tab.

9. The reaction assembly according to claim 4, wherein said tab is part of a tab washer separate from said keeper ring disposed axially between the overrunning clutch outer race and said keeper ring and connected for rotation with said keeper ring.

10. The reaction assembly according to claim 9, wherein the said bayonet mount means comprises at least two radial lugs extending radially inwardly from the reactor hub and in registration therewith at least two radially outwardly extending lugs at the outer periphery of said keeper ring.

11. The reaction assembly according to claim 10, wherein said tab washer comprises at least two tongues in engagement with a lug of said keeper ring for connecting said tab washer.

* * * * *